US006312330B1

(12) United States Patent
Jones et al.

(10) Patent No.: US 6,312,330 B1
(45) Date of Patent: *Nov. 6, 2001

(54) METHODS OF PROGRESSIVE JACKPOT GAMING

(75) Inventors: Daniel A. Jones; James P. Suttle, both of Las Vegas, NV (US)

(73) Assignee: Progessive Games, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/436,772

(22) Filed: Nov. 5, 1999

Related U.S. Application Data

(63) Continuation of application No. 09/266,613, filed on Mar. 9, 1999, now Pat. No. 6,045,130, which is a continuation of application No. 08/967,850, filed on Nov. 12, 1997, now Pat. No. 5,913,726, which is a continuation of application No. 08/811,364, filed on Mar. 6, 1997, now Pat. No. 5,795,225, which is a continuation of application No. 08/337,661, filed on Nov. 9, 1994, now Pat. No. 5,626,341, which is a division of application No. 08/040,925, filed on Mar. 31, 1993, now Pat. No. 5,364,104, which is a division of application No. 07/800,631, filed on Nov. 27, 1991, now Pat. No. 5,288,077, which is a continuation-in-part of application No. 07/361,276, filed on Jun. 5, 1989, now Pat. No. 5,078,405, which is a division of application No. 07/214,934, filed on Jul. 5, 1988, now Pat. No. 4,861,041, which is a continuation-in-part of application No. 07/182,374, filed on Apr. 18, 1988, now Pat. No. 4,836,553.

(51) Int. Cl.[7] ....... A63F 13/00

(52) U.S. Cl. ....... 463/13; 463/25; 463/26; 463/27; 273/292

(58) Field of Search ....... 273/292, 274, 273/309; 463/25–27, 13, 12

(56) References Cited

U.S. PATENT DOCUMENTS

| | | | |
|---|---|---|---|
| D. 105,610 | 8/1937 | Posey | D6/618 |
| D. 118,451 | 1/1940 | Radford | D21/26 |
| D. 183,007 | 6/1958 | Lord | D21/26 |
| D. 213,891 | 4/1969 | Schultz | D21/32 |
| D. 220,635 | 5/1971 | Boyer et al. | D21/30 |

(List continued on next page.)

FOREIGN PATENT DOCUMENTS

| | | |
|---|---|---|
| 621599 | 4/1989 | (AU) . |
| 628044 | 4/1989 | (AU) . |
| 96049 | 4/1989 | (AT) . |
| 1334983 | 3/1995 | (CA) . |
| 1335381 | 4/1995 | (CA) . |

OTHER PUBLICATIONS

Frank H. Croes, Aruba Copyright, AUT–880113.11, Jan. 1988.*

Winning Gamer, Issue #5, Feb. 1985, Pi Yee Press, LaJolla, CA.

Winning Gamer, Issue #6, Mar. 1985, Pi Yee Press, LaJolla, CA.

Winning Gamer, Issue #15, Dec. 1985, Pi Yee Press, LaJolla, CA.

Winning Gamer, Issue #19, Apr. 1986, Pi Yee, La Jolla, CA.

(List continued on next page.)

*Primary Examiner*—Benjamin H. Layno

(57) ABSTRACT

A method for including a progressive jackpot component in a live casino table game. In addition to playing a live casino table game, each player makes an additional wager at the beginning of each hand that makes the player eligible to win all or part of a jackpot. If during the play of the hand a player is dealt a predetermined arrangement of cards, the player wins a preselected percentage of the jackpot amount. The jackpot is progressive in that unwon amounts of the jackpot carry over to the next hand. Apparatus is provided to receive each gaming token wagered for the jackpot component, to increment the jackpot meter whcih displays the jackpot amount, to decrement the jackpot meter whenever a winning hand is paid and to reset the apparatus for the next hand.

17 Claims, 4 Drawing Sheets

U.S. PATENT DOCUMENTS

| | | | |
|---|---|---|---|
| D. 245,717 | 9/1977 | Jessie | D21/32 |
| D. 263,975 | 4/1982 | Quisuga et al. | D21/37 |
| D. 311,474 | 10/1990 | Hoffman | D6/618 |
| 1,238,736 | 9/1917 | Barrett | 453/18 |
| 1,527,929 | 2/1925 | Simons | 273/274 |
| 1,763,476 | 6/1930 | Morris | 273/309 |
| 1,970,876 | 8/1934 | Anderson | 273/309 |
| 2,008,829 | 7/1935 | Israel | 273/148 A |
| 2,199,745 | 5/1940 | Harris | 273/309 |
| 3,011,789 | 12/1961 | Eliassen et al. | 273/148 R |
| 3,269,503 | 8/1966 | Foster | 463/26 |
| 3,556,531 | 1/1971 | Elder | 273/143 R |
| 3,663,021 | 5/1972 | Whippo | 273/274 |
| 3,667,757 | 6/1972 | Holmberg | 273/274 |
| 3,689,071 | 9/1972 | Kucera | 273/281 |
| 3,796,433 | 3/1974 | Fraley et al. | 463/18 |
| 3,825,255 | 7/1974 | Kennard et al. | 273/139 |
| 3,874,671 | 4/1975 | Smith | 273/254 |
| 3,876,208 | 4/1975 | Wachtler et al. | 463/13 |
| 3,998,462 | 12/1976 | Goott | 273/437 |
| 4,063,680 | 12/1977 | Leo | 232/1 D |
| 4,099,722 | 7/1978 | Rodesch et al. | 273/143 R |
| 4,232,866 | 11/1980 | Pennachio | 273/374 |
| 4,302,012 | 11/1981 | Di Giovanni et al. | 273/148 R |
| 4,305,586 | 12/1981 | Richards | 273/274 |
| 4,312,508 | 1/1982 | Wood | 273/274 |
| 4,364,567 | 12/1982 | Goott | 273/237 |
| 4,397,469 | 8/1983 | Carter, III | 273/149 R |
| 4,518,001 | 5/1985 | Branham | 453/49 |
| 4,531,187 | 7/1985 | Uhland | 364/410 |
| 4,569,526 | 2/1986 | Hamilton | 273/242 |
| 4,575,085 | 3/1986 | Ollington | 273/138.1 |
| 4,614,342 | 9/1986 | Takashima | 463/11 |
| 4,624,459 | 11/1986 | Kaufman | 273/143 R |
| 4,648,604 | 3/1987 | Horan | 273/292 |
| 4,651,997 | 3/1987 | Wood | 273/274 |
| 4,666,160 | 5/1987 | Hamiton | 273/242 |
| 4,700,948 | 10/1987 | Okada | 273/143 R |
| 4,721,307 | 1/1988 | Okada | 273/143 R |
| 4,743,022 | 5/1988 | Wood | 463/13 |
| 4,756,531 | 7/1988 | DiRe et al. | 273/274 |
| 4,759,549 | 7/1988 | Beckwith | 273/274 |
| 4,760,527 | 7/1988 | Sidley | 364/412 |
| 4,813,675 | 3/1989 | Greenwood | 463/46 |
| 4,836,546 | 6/1989 | DiRe et al. | 463/18 |
| 4,836,553 | 6/1989 | Suttle et al. | 273/292 |
| 4,837,728 | 6/1989 | Barrie et al. | 364/412 |
| 4,861,041 | 8/1989 | Jones et al. | 273/292 |
| 4,926,327 | 5/1990 | Sidley | 364/412 |
| 4,948,134 | 8/1990 | Suttle et al. | 463/13 |
| 4,964,638 | 10/1990 | Ishida | 463/27 |
| 5,007,510 | 4/1991 | Mercurio | 194/230 |
| 5,019,973 | 5/1991 | Wilcox et al. | 364/412 |
| 5,022,653 | 6/1991 | Suttle et al. | 463/13 |
| 5,042,818 | 8/1991 | Weingardt | 273/292 |
| 5,078,405 | 1/1992 | Jones et al. | 273/309 |
| 5,092,598 | 3/1992 | Kamille | 273/139 |
| 5,098,107 | 3/1992 | Boylan et al. | 273/292 |
| 5,100,137 | 3/1992 | Fulton | 463/13 |
| 5,106,089 | 4/1992 | Wood | 273/139 |
| 5,112,060 | 5/1992 | Jones | 273/309 |
| 5,154,429 | 10/1992 | Le Vasseur | 273/292 |
| 5,167,413 | 12/1992 | Fulton | 463/13 |
| 5,248,142 | 9/1993 | Breeding | 273/138.1 |
| 5,249,800 | 10/1993 | Hilgendorf et al. | 463/27 |
| 5,251,897 | 10/1993 | Fulton | 463/13 |
| 5,255,915 | 10/1993 | Miller | 463/13 |
| 5,257,784 | 11/1993 | Boylan et al. | 273/138.1 |
| 5,257,810 | 11/1993 | Schorr et al. | 273/292 |
| 5,265,877 | 11/1993 | Boylan et al. | 273/139 |
| 5,275,400 | 1/1994 | Weingardt et al. | 463/12 |
| 5,275,411 | 1/1994 | Breeding | 273/149 |
| 5,275,415 | 1/1994 | Wisted | 273/274 |
| 5,277,424 | 1/1994 | Wilms | 463/12 |
| 5,286,023 | 2/1994 | Wood | 273/138.2 |
| 5,288,077 | 2/1994 | Jones | 273/292 |
| 5,288,081 | 2/1994 | Breeding | 273/292 |
| 5,294,128 | 3/1994 | Marquez | 273/292 |
| 5,322,295 | 6/1994 | Cabot et al. | 273/292 |
| 5,364,104 | 11/1994 | Jones et al. | 273/292 |
| 5,364,105 | 11/1994 | Jones | 273/292 |
| 5,374,067 | 12/1994 | Jones | 273/292 |
| 5,377,973 | 1/1995 | Jones | 273/292 |
| 5,377,994 | 1/1995 | Jones | 273/292 |
| 5,380,012 | 1/1995 | Jones et al. | 273/292 |
| 5,382,025 | 1/1995 | Sklansky et al. | 273/292 |
| 5,390,934 | 2/1995 | Grassa | 273/292 |
| 5,393,067 | 2/1995 | Paulsen et al. | 273/292 |
| 5,401,023 | 3/1995 | Wood | 273/292 |
| 5,411,257 | 5/1995 | Fulton | 273/292 |
| 5,417,430 | 5/1995 | Breeding | 463/13 |
| 5,437,462 | 8/1995 | Breeding | 273/292 |
| 5,445,391 | 8/1995 | Gleason, Jr. | 273/304 |
| 5,472,194 | 12/1995 | Breeding et al. | 273/292 |
| 5,489,101 | 2/1996 | Moody | 273/292 |
| 5,494,296 | 2/1996 | Grassa | 273/292 |
| 5,511,781 | 4/1996 | Wood et al. | 463/13 |
| 5,531,448 | 7/1996 | Moody | 273/292 |
| 5,536,016 | 7/1996 | Thompson | 273/269 |
| 5,573,245 | 11/1996 | Weiner et al. | 273/153 R |
| 5,577,731 | 11/1996 | Jones | 273/292 |
| 5,584,485 | 12/1996 | Jones et al. | 273/292 |
| 5,597,162 | 1/1997 | Franklin | 273/292 |
| 5,605,504 | 2/1997 | Huang | 463/22 |
| 5,626,341 | 5/1997 | Jones et al. | 273/292 |
| 5,636,843 | 6/1997 | Roberts | 273/292 |
| 5,664,781 | 9/1997 | Feola | 273/292 |
| 5,695,402 | 12/1997 | Stupak | 463/20 |
| 5,713,573 | 2/1998 | Nazaryan | 273/292 |
| 5,718,631 | 2/1998 | Invencion | 463/19 |
| 5,725,216 | 3/1998 | Jones | 273/292 |
| 5,732,950 | 3/1998 | Moody | 273/292 |
| 5,743,798 | 4/1998 | Adams et al. | 273/292 |
| 5,755,621 | 5/1998 | Marks et al. | 463/42 |
| 5,770,533 | 6/1998 | Franchi | 463/42 |
| 5,772,211 | 6/1998 | Nazaryan et al. | 273/292 |
| 5,775,992 | 7/1998 | Wood et al. | 463/13 |
| 5,785,593 | 7/1998 | Wood et al. | 463/13 |
| 5,788,241 | 8/1998 | Ung | 273/292 |
| 5,794,964 | 8/1998 | Jones et al. | 273/292 |
| 5,795,225 | 8/1998 | Jones et al. | 273/292 |
| 5,803,809 | 9/1998 | Yoseloff | 463/13 |
| 5,810,361 | 9/1998 | Kadlic | 273/292 |
| 5,823,873 | 10/1998 | Moody | 463/13 |
| 5,839,730 | 11/1998 | Pike | 273/292 |
| 5,839,731 | 11/1998 | Feola | 273/292 |
| 5,842,698 | 12/1998 | Brown | 273/292 |
| 5,845,906 | 12/1998 | Wirth | 273/274 |
| 5,851,147 | 12/1998 | Stupak et al. | 463/13 |
| 5,851,148 | 12/1998 | Brune et al. | 463/25 |
| 5,868,618 | 2/1999 | Netley et al. | 463/13 |
| 5,868,619 | 2/1999 | Wood et al. | 463/13 |
| 5,882,259 | 3/1999 | Holmes, Jr. et al. | 63/13 |
| 5,882,260 | 4/1999 | Marks et al. | 463/13 |

FOREIGN PATENT DOCUMENTS

| | | |
|---|---|---|
| 2830216 | 1/1980 | (DE) . |
| 3003376 | 8/1981 | (DE) . |
| 68909992 | 4/1989 | (DE) . |
| 4792 | 6/1991 | (DO) . |
| 4793 | 6/1991 | (DO) . |

| | | |
|---|---|---|
| 4825 | 3/1993 | (DO) . |
| 4999 | 9/1993 | (DO) . |
| 03384029 | 4/1989 | (EP) . |
| 2083936 | 3/1982 | (GB) . |
| 2097570 | 11/1982 | (GB) . |
| 2177610A | 7/1985 | (GB) . |
| 2169736 | 7/1986 | (GB) . |
| 2184029 | 6/1987 | (GB) . |
| 0338644 | 4/1989 | (IT) . |
| 135187 | 6/1988 | (JP) . |
| 4-371186 | 6/1991 | (JP) . |
| 93/10869 | 6/1993 | (WO) . |
| 94/15684 | 7/1994 | (WO) . |
| 95/21665 | 8/1995 | (WO) . |
| 97/13562 | 4/1997 | (WO) . |
| 92/20417 | 11/1997 | (WO) . |

OTHER PUBLICATIONS

Winning Gamer, Issue #20, May 1986, Pi Ye Press, La Jolla, CA.
Winning Gamer, Issue #21, Jun. 1986, Pi Ye Press, La Jolla, CA.
Affidavit of John F. Acres, Oct. 4, 1993.
Affidavit of William Randal Adams, Oct. 4, 1993.
Affidavit of Derell M. Johns, Nov. 19, 1993.
Affidavit of Terry Oliver, Nov. 22, 1993.
Affidavit of Nick Edward Greenwood, Nov. 23, 1993.
Affidavit of Michael Spencer Stone, Nov. 23, 1993.
Scarne, Scarne's Encyclopedia of Games, Harper & Row, N.Y., Copyright 1973, P. 381, 383 and title pages,
Scarne, Scarne's Encyclopedia of Games, Harper & Row, N.Y., Copyright 1973, p. 33–41 and title pages.
Scarne, Scarne's New Complete Guide To Gambling, Simon & Schuster, N.Y., Copyright 1961, p. 440–445.
Scarne, Scarn's Encyclopedia of Games, Harper & Row, N.Y.,Copyright 1983, p. 299–305; 383 and title pages.
W.E. Gibson, Hoyle's Modern Encyclopedia of Card Games, p. 218–9, 369–70 (1974).
Casino Player, vol. IV, No. 12, Aug. 1993, "My Biggest Slot Jackpot", Stanford Wong.
Gaming Concepts, Inc. "Over/Under 13 Blackjack" brochure, 1988.
Casing Gaming, Sep. 1988, "Aruba Deals a New Game: Caribbean Stud Poker", p. 12–13.
Casino Journal, vol. 8, No. 12, Dec. 1992, "Working Within the Systems: IGT's linked progressive programs take leap to the tables", p. 10–15, 40, 41.
Casino Journal, vol. 8, No. 6, Jun. 1993, "So You Want to be a Gamble", p. 1,5.
Las Vegas Sun "A New Game Introduced" Mar. 5, 1982.
Las Vegas Sportsbook "Sklansky Invents New Casino Games" Mar. 19–25, 1982.
Vegas World "Casino Poker".
Sklansky "Casino Poker" rule card, tX899,489, copyrighted Apr. 4, 1982.
Bob Stupak's Vegas World "Casino Poker Rules".
Informatin Disclosure Statement, Apr. 7, 1988, describing "Sklansky's Casino Poker" and "Video Poker".
Coin Hopper Model CH–500 and Model No. CH–750–U1 literature Asahi Seiko.
Jan. 26, 1993 Statement of Grounds and Particulars, by John Huxley Ltd., in opposition to Australian Petition for Patent Application No. 628044.
State of New Jersey Casino Control Commission PRN 217205 Civil Action, IGT's Second Amended Peitition for Authorization for the Implementation of the Game of Progressive 21, filed sometime after Aug. 4, 1992
Review Journal, "Gamblers Take Chance at Million Dollar Payoff" by D.J. Boyer.
Winning Gamer, Issue#17, Feb. 1986, Pi Yee Press, La Jolla CA.
Scarne, Scarne's Encyclopedia of Games, "Hold'Em", Harper & Row Publishers, Copyright 1973, p. 14–18, 26.
Abercrobe & Fitch, Play Hours, 1960, p. 11, Blackjack Towel.
Scarne, Scarne's Encyclopedia of Games, copyright date unknown, p. 288.
Jim Kilby's Declaration under 37 C.F. R. 1.132.
TXU 184,603, Mar. 30, 1985.
Scarne, Scarne's Guide to Modern Poker, copyright unknown, p. 40, 60–61.
Request for Reexamination, U.S. Patent No. 4,861,041, issued Aug. 29, 1989; date of service, Jun. 20, 1995.
Request for Reexamination, U.S. Patent No. 4,861,041, issued Aug. 29, 1989; date of service, Sep. 2, 1993.
Request for Reexamination, U.S. Patent No.5,288,077, issued Feb. 22, 1994; date of service May 26, 1995.
Request for Reexamination, U.S. Patent No.5,364,105, issued Nov. 15, 1994; date of service, 5/296/95.
Asahi Seki Catalog No. AV89C, Aug. 20, 1989; p. 44, 51 and Photograph "A".
Scarnes, Scarne's Encyclopedia of Games, Copyright 1973, p. 11, 31, 440–445.
Declaration of I. Nelson Rose, dated Jan. 26, 1989.
Declaration of Don Clark, dated Feb. 2, 1989.
Affidavit of Dennis Robie, dated Jan. 27, 1989.
Declaration of Mark A. Sincox, dated Feb. 7, 1989.
Declaration of John Edward Roethel, dated Feb. 7, 1989.
Commerce Casino Brochure Re Wisted' California Blackjack.
D&D Gaming Patent, Inc. v. Rio Properties, Inc. et al.: Case No.: CV–S–93–835–LDG–RLH; Defendants Request for Reexamination, U.S. Patent No. 5,377,973, issue Jan. 3, 1995.
PCT Written Opinion US 96/16409.
Royal Match 21 "Win Your Fortune" brochure, copyrighted 1991.
Fortune Card 21 "Win Your Fortune" brochure, copyrighted 1991.
Winning Gamer, Issue #17, Feb. 1986.
Over/Under 13 Blackjack brochure.
Official Rules of Card Games, edited by A.H. Morehead, p. 78–93, copyright date 1968.
Specific Model Information Form FO–652–216.
Table Layout for "Casino Poker" Feb. 15, 1992.

* cited by examiner

METHODS OF PROGRESSIVE JACKPOT GAMING

CROSS REFERENCE TO RELATED APPLICATIONS

This application is a continuation of application Ser. No. 09/266,613, filed Mar. 9, 1999, and now U.S. Pat. No. 6,045,130, which is a continuation of application Ser. No. 08/967,850, filed Nov. 12, 1997, and now U.S. Pat. No. 5,913,726, which is a continuation of application Ser. No. 08/811,364, filed Mar. 6, 1997, and now U.S. Pat. No. 5,795,225, which is a continuation of application Ser. No. 08/337,661, filed Nov. 9, 1994, and now U.S. Pat. No. 5,626,341, which is a division of application Ser. No. 08/040,925, filed Mar. 31, 1993, and now U.S. Pat. No. 5,364,104, which is a division of application Ser. No. 07/800,631 filed Nov. 27, 1991 now U.S. Pat. No. 5,288,077; which is a continuation-in-part of application Ser. No. 07/361,276, filed Jun. 5, 1989 and now U.S. Pat. No. 5,078,405; which is a division of application Ser. No. 07/214,934, filed Jul. 5, 1988 and now U.S. Pat. No. 4,861,041; which is a continuation-in-part of application Ser. No. 07/182,374, filed Apr. 18, 1988 and now U.S. Pat. No. 4,836,553. The entire disclosures of each of the above-listed applications and patents are hereby incorporated by reference herein. The entire disclosure of copending application Ser. No. 07/814,712 filed Dec. 30, 1991 is also hereby incorporated by reference herein.

BACKGROUND OF THE INVENTION

The present invention generally relates to casino or cardroom gaming involving a progressive jackpot. More particularly, it relates to a progressive jackpot that is available to be played by participants in various casino or cardroom table games.

It has become common practice in gaming establishments to provide a progressive jackpot component in connection with electronic or mechanical gaming devices, such as slot machines, video poker machines or keno machines. Typically a plurality or "bank" of machines are electronically interconnected to a common progressive jackpot meter. As gaming tokens are fed into each machine, the amount shown on the jackpot meter progresses incrementally until some lucky player lines up the winning combination, such as three or four 7's on the same row of a slot machine. In video poker, a Royal Flush normally wins the jackpot, although in some variations, a player must achieve a Royal Flush in an exact order, such as A-K-Q-J-10 from left to right, or in a particular suit, such as Spades. In video keno, a player typically must match 15 out of 15 numbers to win the progressive jackpot.

It is an object of the present invention to provide a progressive jackpot component to typical casino or cardroom table games such as poker or Twenty-One.

It is a feature of the present invention to have each participant in the progressive jackpot component win all or part of the amount shown on the progressive jackpot meter if the participant achieves a particular predetermined playing hand.

It is an advantage of the present invention that when the progressive jackpot component is added to typical table games such as poker or Twenty-One that the players will enjoy these games more and that the amount of play will increase.

It is a further object of the present invention to provide apparatus useful in providing the progressive jackpot component to casino or cardroom table games such as poker or Twenty-One.

It is a further feature of the present invention to have a progressive jackpot meter electronically interconnected to one or more gaming tables to allow each player at his playing location to participate in the progressive jackpot component by wagering a gaming token which automatically activates an indicator showing the player's participation and also automatically increments the progressive jackpot meter.

It is an advantage of the present invention that the apparatus makes it easy for each player to participate in the progressive jackpot component of the game.

BRIEF SUMMARY OF THE INVENTION

The method of the present invention generally involves a typical casino or cardroom game modified to include a progressive jackpot component. During the play of a Twenty-One game, for example, in addition to his normal wager, a player will have the option of making an additional wager that becomes part of, and makes the player eligible to win, the progressive jackpot. If the player's Twenty-One hand comprises a particular, predetermined arrangement of cards, the player will win all, or part of, the amount showing on the progressive jackpot. This progressive jackpot feature is also adaptable to any other casino or cardroom game such as Draw Poker, Stud Poker, Lo-Ball Poker or Caribbean Stud™ Poker.

The apparatus used to practice the present invention comprises a gaming table, such as those used for Twenty-One or poker, modified with the addition of a coin acceptor that is electronically connected to a progressive jackpot meter. When a player drops a coin into the coin acceptor, a light is activated at the player's location indicating that he is participating in the progressive jackpot component of the game during that hand. At the same time, a signal from the coin acceptor is sent to the progressive meter to increment the amount shown on the progressive meter. At the conclusion of the play of each hand, the coin acceptor is reset for the next hand. When a player wins all or part of the progressive jackpot, the amount showing on the progressive jackpot meter is reduced by the amount won by the player. Any number of gaming tables can be connected to a single progressive jackpot meter.

DETAILED DESCRIPTION OF THE PREFERRED EMBODIMENTS

Figure 1:
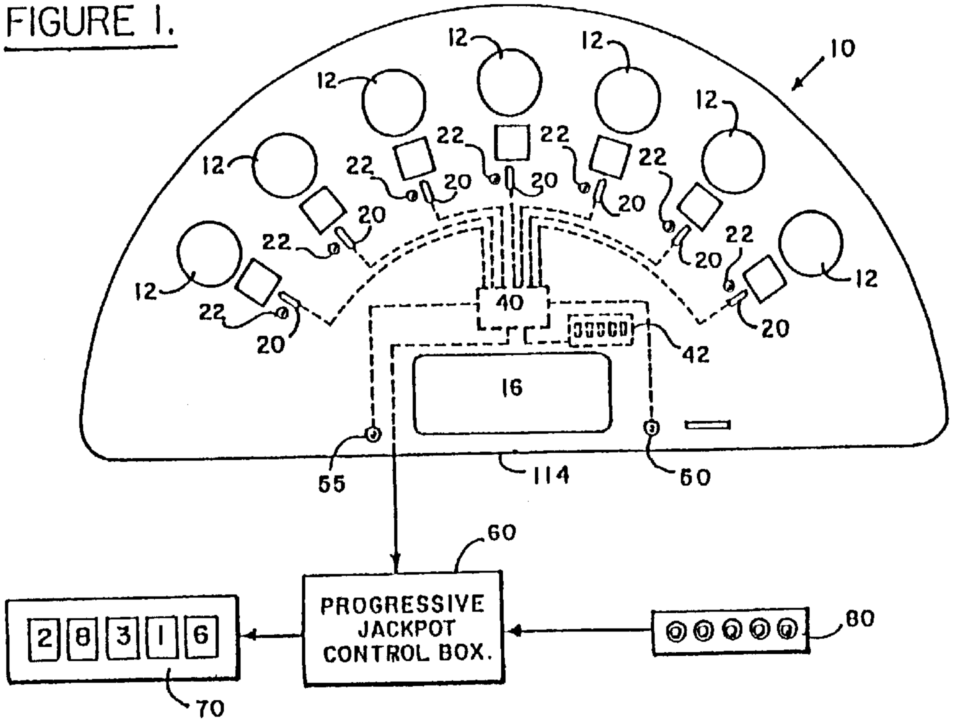
FIG. 1 shows the apparatus of the present invention using a casino gaming table with coin acceptors at each playing location electronically connected to a progressive jackpot meter.

As shown in FIG. 1, a casino gaming table 10 is provided having a plurality of playing locations 12 for players participating in the game being conducted, e.g., Twenty-One. A dealer is positioned at the dealer's location 14 adjacent a chip rack 16. Adjacent to each player location 12 is a coin acceptor 20. Each coin acceptor 20 is electronically connected to a main control board 40 to which is connected a number of odometer-type counters 42 corresponding to the number of playing locations 12 provided on the gaming table 10. As shown in FIG. 1, seven playing locations 12 are preferably provided, although the number of playing locations can be more or less than seven. A reset switch 50 is located adjacent the dealer's location 14 and is electronically connected to the main control board 40 and provides a means whereby the dealer can reset the coin acceptors 20 prior to the beginning of the play of each hand. A lockout switch 55, is also provided adjacent to the dealer's location 14 which is activated by the dealer to prevent later wagering as will be more fully explained herein.

A main control board 40 is electronically connected to a progressive jackpot control box 60 which receives the signals from each coin acceptor 20 and in response to those signals increments the progressive jackpot meter 70, as will be more fully explained herein. Also electronically connected to the progressive control box 60 is the jackpot reset control 80 which provides means for resetting the amount shown on the progressive jackpot meter whenever a player wins all, or part of, the amount shown on the progressive jackpot meter 70.

In operation, the present invention operates as follows. A conventional Twenty-One game is conducted on gaming table 10. At the beginning of each hand, each player, in addition to making his usual wager for the play of the Twenty-One hand, may also make an additional wager to be eligible to participate in the progressive jackpot component of the game during that hand. To do so, a player places a gaming token into the coin acceptor 20 associated with that player's particular playing location 12. As will be more fully explained herein, the coin acceptor 20 "recognizes" that a gaming token has been placed therein and an indicator signal 22, preferably a light, adjacent to the coin acceptor 20 is activated showing that that particular player is participating in the progressive jackpot component of the game during the play of that hand.

Besides activating the indicator signal 22, the coin acceptor 20 also sends an electronic signal to the main control board 40. This signal is sent by the main control board 40 to the odometer-type counter 42 corresponding to the particular playing location 12 to keep a sequential count of the number of gaming tokens that are placed in the particular coin acceptor 20.

The main control board 40 also activates the progressive jackpot control box 60 which in turn controls the progressive jackpot meter 70. Each gaming token placed in a coin acceptor 20 results in the amount shown on the progressive jackpot meter being increased by a predetermined amount. If, for example, each gaming token has a value of one dollar, then the amount shown on the progressive jackpot meter would be increased by any amount up to one dollar for each gaming token placed into a coin acceptor 20. In the preferred embodiment of the present invention, the progressive jackpot would be increased between 93% to 97% of the amount of each gaming token being wagered, the balance representing the house's share of the amount wagered for providing the progressive jackpot component of the game.

When each player has had a reasonable opportunity to make a progressive jackpot wager, the dealer activates lockout switch 55 which deactivates each coin acceptor 20. Any tokens placed in a coin acceptor 20 after lockout switch 55 is activated will not register. This prevents late wagering after the cards are dealt.

The amount shown on the progressive jackpot meter will continue to increase for each gaming token wagered until a player achieves a winning hand. Preselected winning hands earn a player all or part of the amount shown on the progressive jackpot meter. In a preferred embodiment, the preselected wining hands and payoff amounts in Twenty-One game are as follows:

| Winning Hand | Amount of Jackpot |
|---|---|
| Four 5's and an Ace | 100% |
| Ace, two, three, four, five and six | 4% |
| Six, seven and eight of same suit | 100 tokens |
| Three 7's | 50 tokens |

The invention is not limited to these particular combinations of winning hands or payoffs; other winning hand combinations or payoff amounts can be utilized.

When a player achieves a winning hand, the jackpot reset control 80 is manually activated by pushing a button that corresponds to the type of hand that the player achieved. The amount won by the player is thus electronically deducted from the amount showing on the progressive jackpot meter.

When a particular hand is completed at gaming table 101, the dealer presses the reset switch 50, which deactivates the indicator signal 22. Lockout switch 55 is also manually deactivated by the dealer. The coin acceptor 20 is thus readied to receive another gaming token for the next hand.

The progressive jackpot component of the present invention can also be used in connection with other types of casino games, e.g., Caribbean Stud™ Poker, which is the subject matter of U.S. patent application Ser. No. 182,374 filed Apr. 18, 1988, which is incorporated herein by reference thereto. Caribbean Stud™ Poker is a modification of conventional five-card stud poker. Each player makes an ante and a dealer deals five cards to each player and to himself. The player's cards are dealt face down and the dealer's cards are dealt four cards face down and one card face up. Each player views his hand and then decides whether to continue to play by making an additional bet or to fold or drop, in which case he loses his ante. The dealer then reveals his entire hand; if the dealer's hand does not have a poker value of at least Ace-King, then the dealer is not permitted to continue to play. In that case, the dealer pays even money on the remaining players' antes, and returns their bets to them. If the dealer's hand has a poker value of Ace-King or better, the dealer compares his hand to each player's hand, paying or collecting the bets as appropriate. The dealer also pays odds of more than even money on each winning player's hand of two pair or better according to a bonus payment schedule. This game can be played using the gaming table shown in FIG. 1. Each player makes a progressive jackpot wager by placing a gaming token in the coin acceptor 20 which makes that player eligible to participate in the progressive jackpot amount shown on the meter 70. The winning hands and amounts for Caribbean Stud Poker are preferably as follows:

| Hand | Amount |
|---|---|
| Royal Flush | 100% |
| Straight Flush | 10% |

-continued

| Hand | Amount |
|---|---|
| Four of a Kind | 1% |
| Full House | 50 tokens |
| Flush | 25 tokens |

Again the invention is not limited to these particular combinations of hands or payoff amounts; other hand combinations or payoff amounts can be utilized.

Figure 2:
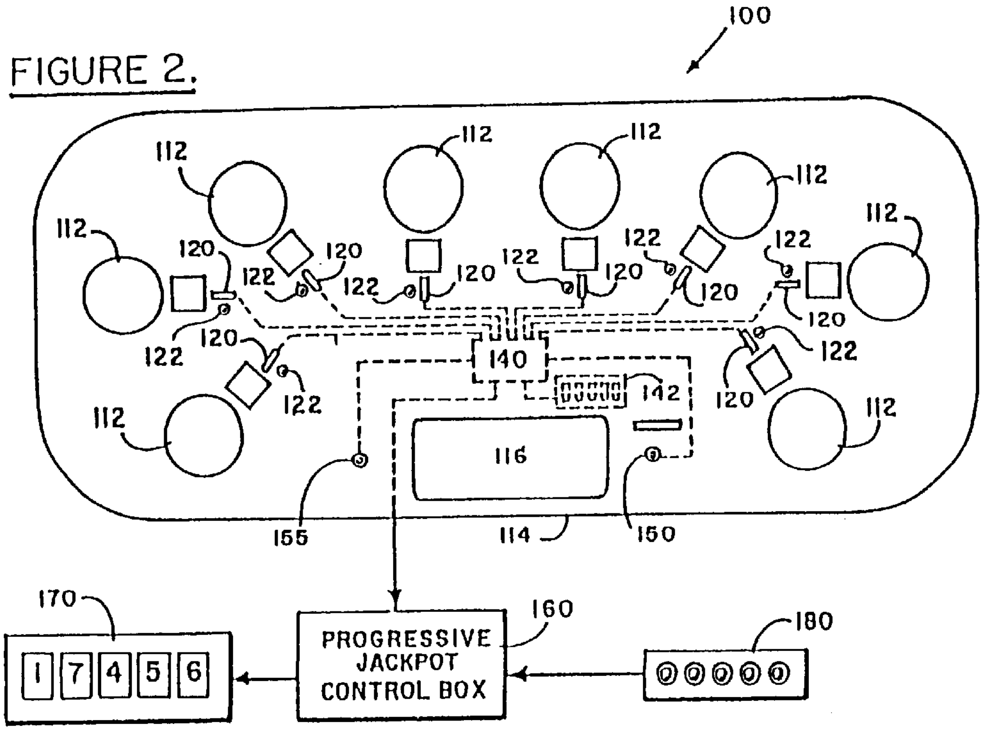
FIG. 2 shows an alternate embodiment of the present invention using a cardroom gaming table with coin acceptors at each playing location electronically connected to a progressive jackpot meter.

The invention can also be adapted to other casino or cardroom poker games such as Stud Poker, Draw Poker or Lo-Ball Poker. The gaming table 100 used to play each of these games is modified as shown in FIG. 2 by the addition of coin acceptors 120 and indicator signals 122 at each player's location 112. The electronics is the same as that shown in FIG. 1 and includes a main control board 140, an odometer-type counter 142, a progressive jackpot control box 160, a progressive jackpot meter 170 and a jackpot reset control 100. A reset switch 150 and a lockout switch 155 are located adjacent the dealer's location 114 next to the chip rack 116.

The progressive jackpot meter 170 is incrementally increased in the same manner as that description in connection with FIG. 1 by each player placing a gaming token in the coin acceptor 120.

The winning hands and payoff amounts are preselected as appropriate for the type of game being played. In the preferred embodiment, the winning hands and payoff amounts are as follows:

I. Five Card Draw Poker

| Hand | Amount |
|---|---|
| Royal Flush | 100% |
| Straight Flush | 10% |
| Four of a Kind | 100 tokens |
| Full House | 25 tokens |

II. Five Card Stud Poker

| Hand | Amount |
|---|---|
| Royal Flush | 100% |
| Straight Flush | 10% |
| Four of a Kind | 100 tokens |
| Full House | 25 tokens |

III. Seven Card Stud Poker

| Hand | Amount |
|---|---|
| Royal Flush | 100% |
| Straight Flush | 10% |
| Four of a Kind | 100 tokens |
| Full House | 25 tokens |

IV. Lo-Ball Poker

| Hand | Amount |
|---|---|
| 5-4-3-2-Ace | 100% |
| 6-4-3-2 Ace | 5% |
| 6-5-3-2-Ace | 100 tokens |
| 7-4-3-2-Ace | 25 tokens |

These winning hands and payoff amounts are merely preferred embodiments and the invention may be practiced using any appropriate combination of winning hands and payoff amounts.

As an alternative embodiment, progressive jackpot component of the game may be utilized as a consolation payoff for a player who otherwise loses during the play of the regular game. For example, assume the regular game being played is Five Card Stud. Players A and B are both eligible for the progressive jackpot amount because each has placed a gaming token in the coin acceptor prior to the beginning of the play of the hand. Player A holds a hand having Four of a Kind. Player B holds a Full House. Because Player A's hand is higher according to the customary poker hand ranking priority, Player A wins the pot wagered on the Five Card Stud game. As a consolation, however, Player B receives a payoff amount from the progressive jackpot for his Full House, e.g., 25 tokens. Player A does not receive a payoff from the progressive jackpot because he already has won the pot from the regular five Card Stud game. Thus, under this alternative embodiment, a player only receives a payoff from the progressive jackpot if the player both has a hand of the preselected type and loses to a higher hand in the game being played.

Another modification would have the two players sharing in the progressive jackpot amount; the player with the preselected type of hand receiving a percentage of the progressive jackpot amount and the player with the higher poker hand receiving the rest of the progressive jackpot amount. With reference to the example above, Player B would receive 80% of the progressive jackpot amount for a Full House and Player A would receive 20% of the progressive jackpot amount for a Full House.

Figure 3:
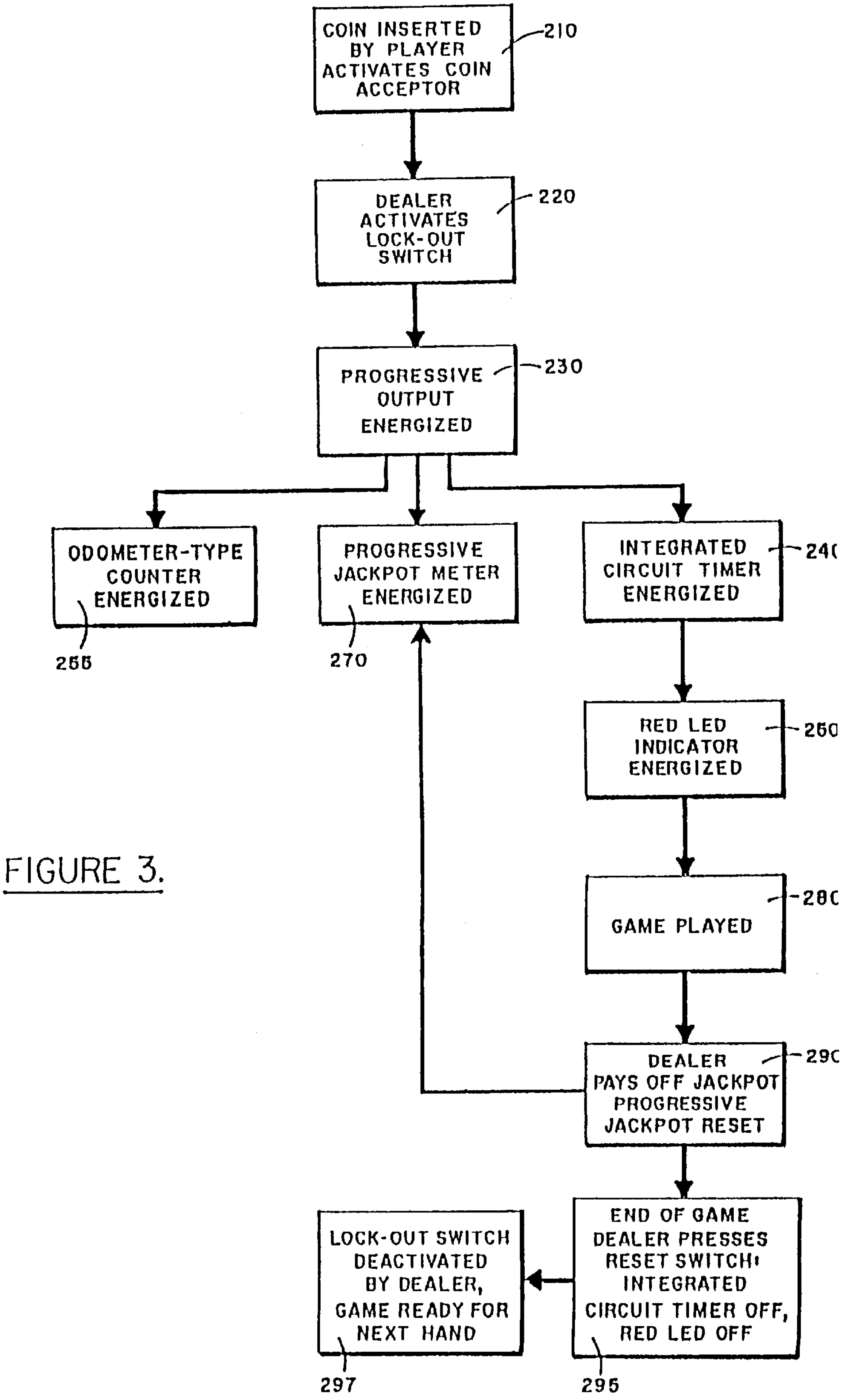
FIG. 3 shows a block diagram of the operation of the present invention.

FIG. 3 shows in block diagram form the operation of the present invention. Each playing location has a coin a acceptor 210 into which a player places a gaming token in order to be eligible for the progressive jackpot amount. When all players have had sufficient time to decide whether to participate in the progressive jackpot for that hand the dealer activates the lockout switch 220 which prevents late wagers. Each gaming token placed in a coin acceptor 210 energizes the progressive output control 230 which in turn activates three separate devices. An integrated circuit timer is energized which causes an indicator light 250 to be illuminated at the location on the coin acceptor in front of the player. This gives a visual indication to the dealer that that player is participating in the progressive jackpot during the play of that hand.

The signal from the progressive jackpot control 230 also activates an odometer-type counter 255 which increments by one unit for each gaming token wagered through the coin acceptor. This allows the gaming establishment to keep an accurate count of the number of wagers made on the progressive jackpot.

The third signal from the progressive jackpot control 230 goes directly to the progressive jackpot meter 270. The progressive jackpot meter 270 shows the total amount available to be won by a player who obtains one of the preselected winning hands. The amount of the progressive jackpot meter 270 automatically increases a predetermined amount for each gaming token placed in a coin acceptor. The progressive jackpot meter 270 is programmed to increase a specified percentage of the amount wagered in the coin acceptor 210. In the preferred embodiment, the progressive jackpot meter will be increased between about 93% to 97% of the amount wagered in the coin acceptor 210.

The dealer then deals the cards to each player and the hand is played 280. If a player has a preselected wining hand, the player is paid the amount corresponding to the type of winning hand that the player has. The jackpot reset control 290 is manually activated which results in the amount of the payoff being automatically deducted from the amount displayed on the progressive jackpot meter 270.

After the winning players have been paid, the dealer activates the reset switch 295 which both turns off the integrated circuit timer 240 and turns off the indicator light 250 and the dealer deactivates the lockout switch 297 thereby activating the coin acceptor 210 for the next hand.

Figure 4:
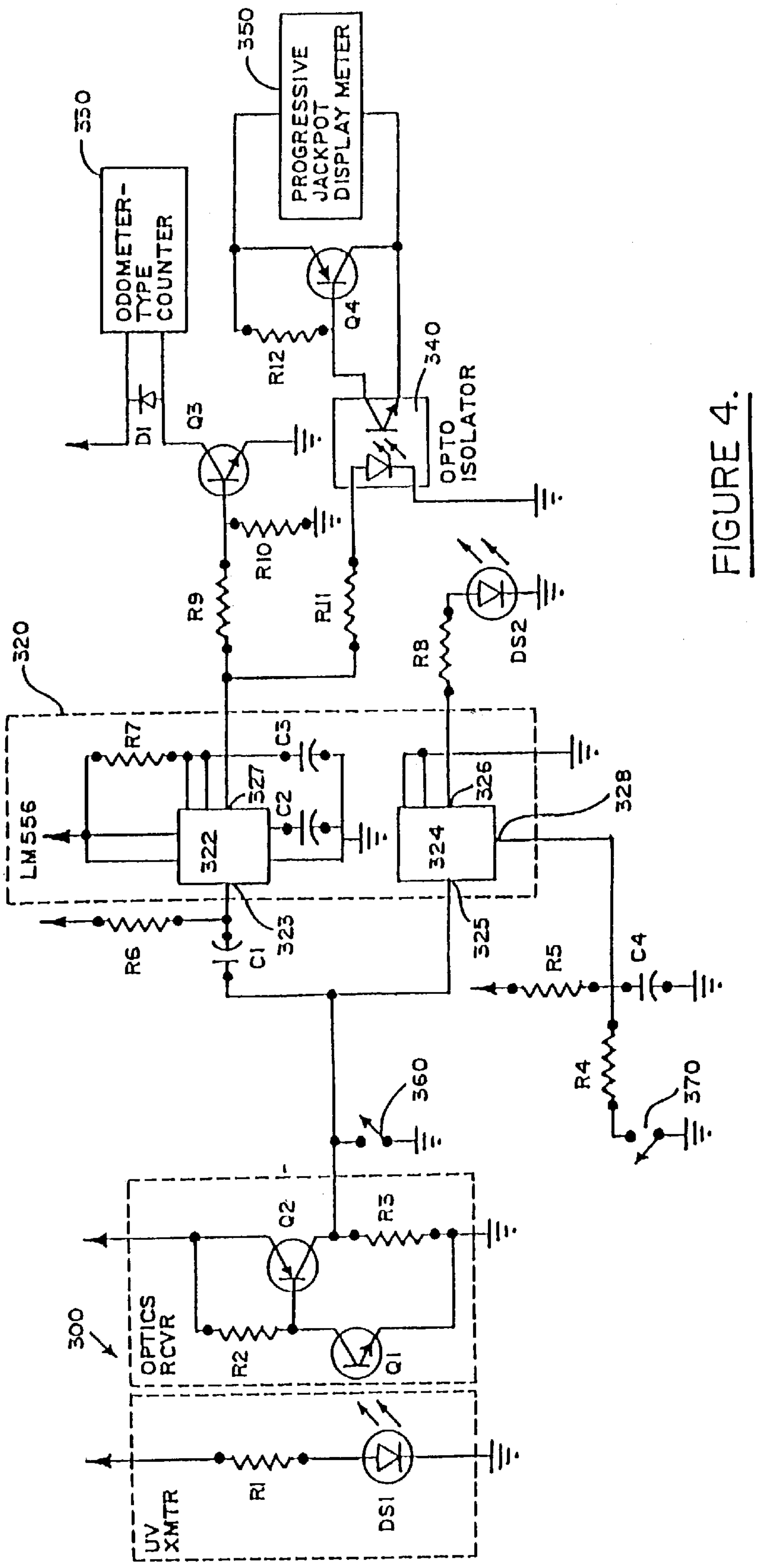
FIG. 4 shows a schematic diagram of the electronic circuitry of the present invention.

FIG. 4 in schematic form depicts the electronic circuitry to operate the apparatus of the present invention. The coin acceptor circuitry 300 is activated when a gaming token is dropped into the slot on the gaming table where the coin acceptor is mounted. The gaming token passes between an ultraviolet transmitter DS1 and an optic receiver Q1 (Model #MRD 300 transistor). This causes a pulse to be passed from the collector of Q1 to the base of receiver Q2. Q2 is a Model #2N3906 transistor and acts as an emitter follower and sends a pulse which is received by the integrated circuit 322, 324 of the main control board 320. The integrated circuit 322, 324 is a Model #LM-556 Timer. The pulse from Q2 is received at pin 325 of the lower portion 324 of the integrated circuit and this pulse causes pin 326 of the lower portion 324 to go high and turn on diode DS2 (a Model P367 diode). This diode DS2 is the indicator light 22 shown in FIG. 1 and this indicator light 22 stays on until the play of the hand is finished.

The pulse from Q2 also is received by pin 323 on the upper portion 322 of the integrated circuit and this pulse creates a pulse at pin 327 of the upper portion 322 which causes transistor Q3 (a Model #T1P120 transistor) to turn on, then off for the duration of the pulse created at pin 327. The turning on and off of transistor Q3 causes the odometer-type counter 42 shown in FIG. 1 to increment one digit. The odometer-type counter 330 is a six-digit non-resetable electronic 12 VDC, WICO Model #31-443400.

The pulse created at pin 327 of the upper portion 322 of the integrated circuit also goes to the opto isolator 340 (which is a Model #H11A16E Opto Isolator). The opto isolator 340 passes this pulse to the base of transistor Q4 (a Model #2N3906 transistor) thereby turning on transistor Q4 for the duration of the pulse. When transistor Q4 is turned on, the pulse is passed to the progressive jackpot display meter 350 where the amount shown on the display meter 350 is increased by a predetermined percentage of the value of the gaming token placed in the coin acceptor 300. The progressive jackpot display meter 350 can typically be a Game Technology Model having 3" LED characters on a 44" length single progressive display.

After all bets are made, the dealer manually presses a lockout switch 360 which will clamp the output of transistor Q2 at a low level which ensures that there can be no late wagers made through the coin acceptor 300. Once the output of transistor Q2 is clamped at a low level, a gaming token placed in the coin acceptor 300 will not cause a pulse to flow through the rest of the circuitry.

The game is then played and once the game is completed, the dealer will manually press the reset switch 370 which creates a reset pulse that activates pin 320 which resets the lower portion 324 of the integrated circuit. This resetting causes pin 326 to go low which will extinguish diode DS2 which turns off the indicator light 22 on the gaming table.

The dealer also manually presses the lockout switch 360 to open the circuit and remove the clamp on the emitter of transistor Q2 which allows another hand to be played. The players commence the next hand by placing gaming tokens in the coin acceptor 300 and the process is repeated.

As will be apparent to those skilled in the art, various resistors and capacitors are provided to complete the circuitry. The specifications on the resistors and capacitors shown in FIG. 4 is as follows:

| Resistors | Capacitors |
|---|---|
| R1-60 Ohm | C1-.1ufd/35v |
| R2-3 Kohm | |
| R3-1 Kohm | C2-.01ufd/35v |
| R4-200 Ohm | |
| R5-4.7 Kohm | C3-.1ufd/35v |
| R6-10 Kohm | |
| R7-1 Mohm | C4-.1ufd/35v |
| R8-240 Ohm | |
| R9-1 Kohm | |
| R10-4.7 Kohm | |
| R11-240 Ohm | |
| R12-1 Kohm | |

Figure 5:
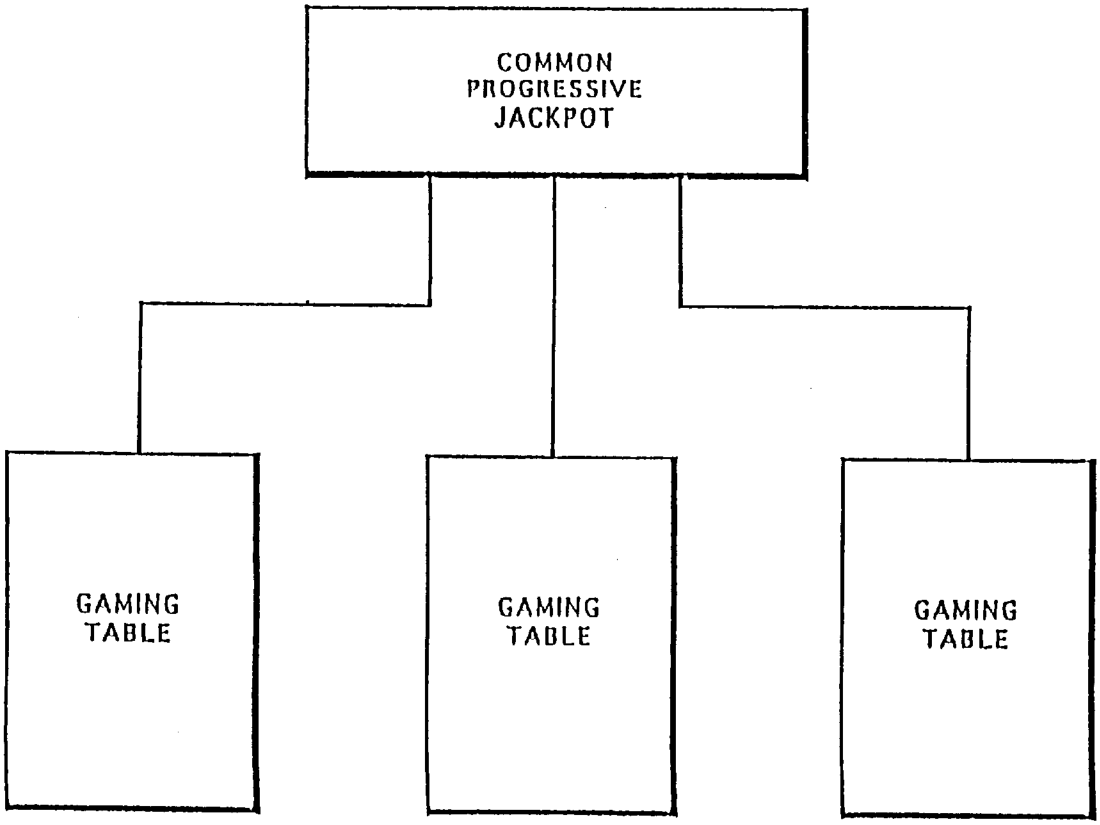
FIG. 5 shows a block diagram of a plurality of gaming tables connected to a single progressive jackpot meter.

As shown in FIG. 5, any number of gaming tables may be connected to a single progressive jackpot meter.

While the invention has been illustrated with respect to several specific embodiments thereof, these embodiments should be considered as illustrative rather than limiting. Various modifications and additions may be made and will be apparent to those skilled in the art. Accordingly, the invention should not be limited by the foregoing description, but rather should be defined only by the following claims.

What is claimed is:

1. A method of including a jackpot component as an additional feature in a card game, which game includes the steps of:

(1) affording a player an opportunity to make a first game wager to participate only in said card game;

(2) a dealer dealing a hand comprising a predetermined number of cards to each of the players and the dealer;

(3) affording each player an opportunity to review such player's hand;

(4) each player deciding either to fold, in which case the player loses his first game wager to the dealer, or to make a second game wager;

(5) for each player who has made said second game wager, comparing such player's hand to the hand of the dealer using a predetermined ranking as the criterion for comparison;

(6) if the dealer's hand is not at least a predetermined rank, the player wins a preselected amount based on the player's first game wager, and the player keeps his second game wager;

(7) if the dealer's hand is at least a predetermined rank, and the dealer's hand is a higher rank than the player's hand, the player loses both his first game wager and his second game wager; and (8) if the dealer's hand is at least a predetermined rank, and the player's hand is a higher rank than the dealer's hand, then the player wins a first predetermined amount on his first game wager and the player wins a second predetermined amount on his second game wager, the method comprising the steps of:

(a) prior to step (2), affording the player an opportunity to optionally make a jackpot wager to participate in said jackpot component, wherein no portion of said jackpot wager contributes to the play or winnings of said card game (b) determining whether the player achieves a preselected winning hand associated with said jackpot wager; and (c) paying to a player achieving said preselected winning hand associated with said jackpot wager a jackpot amount, only if the player opted to make said jackpot wager.

2. The method of claim 1, wherein said card game is stud poker.

3. The method of claim 2, wherein said card game is Caribbean Stud™.

4. The method of claim 1, wherein said jackpot amount is at least 100 times the amount of said jackpot wager.

5. The method of claim 1, wherein each of said hands in step (2) and said preselected winning hand in step (b) each consists of a predetermined number of cards.

6. The method of claim 5, wherein said predetermined number of cards is five.

7. The method of claim 6, wherein one of the dealer's cards is dealt face up and the rest of the dealer's cards are dealt face down.

8. The method of claim 1, wherein said jackpot component includes a progressive jackpot and wherein said jackpot amount is the entire amount of said progressive jackpot.

9. The method of claim 1, wherein the player's cards are dealt face down.

10. The method of claim 1, wherein some of the dealer's cards are dealt face up and the remainder of the dealer's cards are dealt face down.

11. The method of claim 1, wherein the second game wager is a multiple of the first game wager.

12. The method of claim 11, wherein the second game wager is double the first game wager.

13. The method of claim 1, wherein the dealer deals hands from a single standard deck of fifty-two playing cards.

14. The method of claim 1, wherein the predetermined rank in steps (6), (7) and (8) is an Ace-King combination.

15. The method of claim 1, wherein the preselected amount that a player wins in step (6) on the player's first game wager is one-to-one odds.

16. The method of claim 1, wherein the first predetermined amount that a player wins in step (8) on his first game wager is one-to-one odds.

17. The method of claim 1, wherein the preselected amount that a player wins in step (6) on the player's first game wager is one-to-one odds, and wherein the first predetermined amount that a player wins in step (8) on his first game wager is one-to-one odds.

* * * * *